W. M. AND C. J. DOERING.
CONTAINER AND DISPLAY CARTON.
APPLICATION FILED JULY 2, 1920.
1,405,504.
Patented Feb. 7, 1922.
2 SHEETS—SHEET 1.
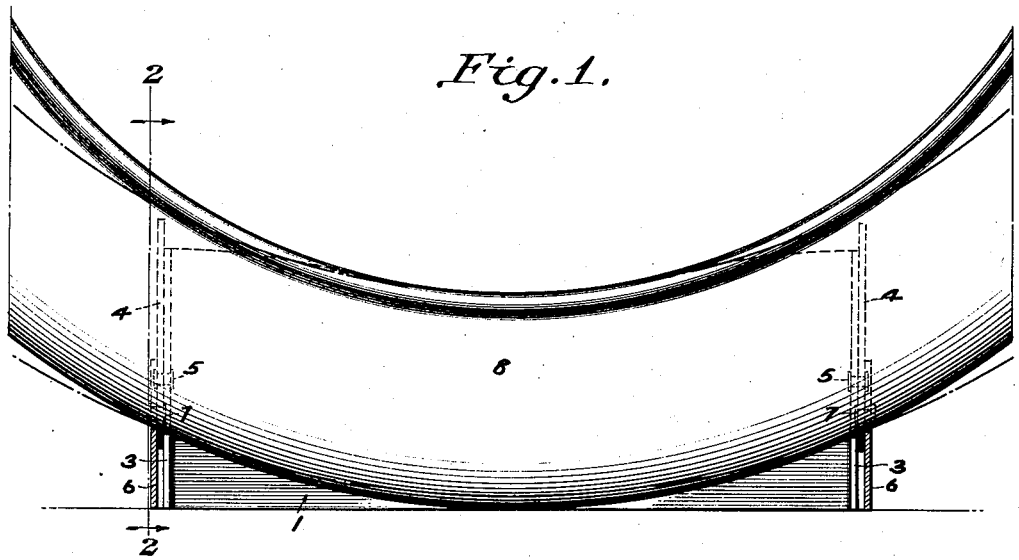
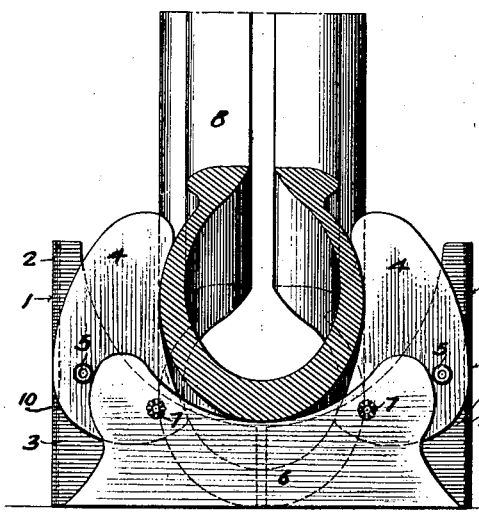
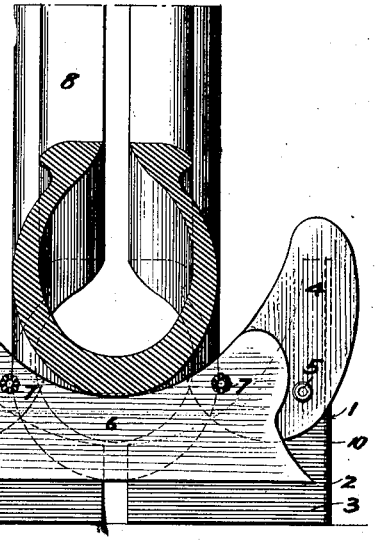
Witness
Francis E. Adam
Inventors:
William M. Doering
Charles J. Doering
By Wood & Wood
Attorneys W. M. AND C. J. DOERING.
CONTAINER AND DISPLAY CARTON.
APPLICATION FILED JULY 2, 1920.

1,405,504.

Patented Feb. 7, 1922.
2 SHEETS—SHEET 2.

UNITED STATES PATENT OFFICE.

WILLIAM M. DOERING AND CHARLES J. DOERING, OF CINCINNATI, OHIO.

CONTAINER AND DISPLAY CARTON.

1,405,504.  Specification of Letters Patent.  Patented Feb. 7, 1922.

Application filed July 2, 1920. Serial No. 393,649.

*To all whom it may concern:*

Be it known that we, WILLIAM M. DOERING and CHARLES J. DOERING, citizens of the United States, and residing at Cincinnati, in the county of Hamilton and State of Ohio, have invented a new and useful Improvement in Containers and Display Cartons, of which the following specification is a full disclosure.

This invention relates to display and advertising racks, especially designed for exhibiting tire casings, and has for its objects to provide a structure that may be cheaply manufactured from cardboard stock or the like, that provides a clamp for a tire placed therein, which clamp is operated by the weight of the tire so placed, and that provides two plane faces upon which advertising matter may be printed and displayed.

Another object is to form the elements of the rack by stamping from cardboard stock the duplicate parts.

An additional object is to so construct the rack that the same may be folded in a compact form for shipping or storing purposes.

Other objects and certain advantages will be set forth in the description and special reference is made to the drawings forming a part of this specification, in which:

Fig. 1 is a longitudinal section of my display rack, a segment of a tire being shown clamped therewithin.

Fig. 2 is an end elevation illustrating the clamping action, the tire being cut as indicated, on the line 2—2, Fig. 1.

Fig. 3 is a view similar to Fig. 2, showing the position of the parts previous to the insertion of the tire.

Figure 4:
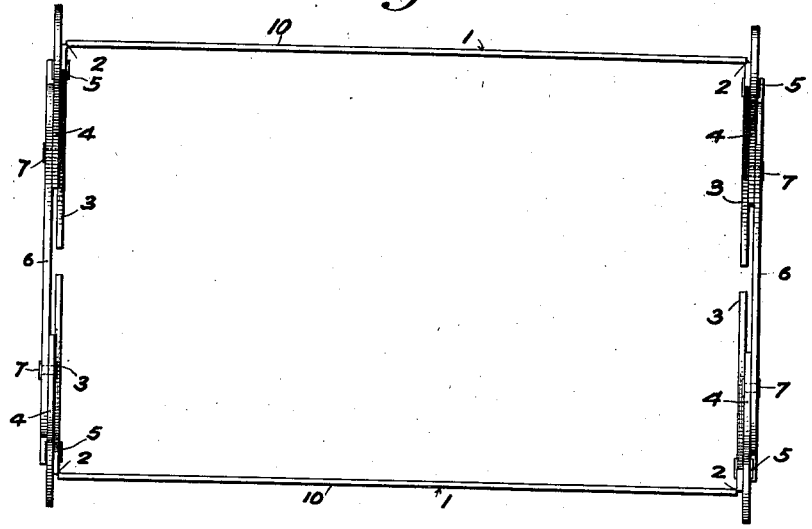
Fig. 4 is a top plan view, the parts being positioned as shown in Fig. 3.

In carrying out our invention, we provide two upright substantially rectangular parallel side walls or member side sections 1, scored at each end as at 2, to provide end flaps or half end sections 3, foldable at right angles to the side walls to form supports for the clamping jaws 4, pivoted thereon as at 5, and arranged in opposing pairs at the side walls. The upper edge of each of the end sections or flaps are cut inwardly curved so that the opposing sections together provide a semi-circular pocket. A bridge or cross member 6 is pivoted, as at 7, to each of the jaws 4, and the said member acts as a tire rest and as a means for operating the jaws 4, to bring the same in clamping contact with the tire designated at 8. Upon the outer faces 10, of the side walls 1, advertising matter is displayed.

Figure 5:
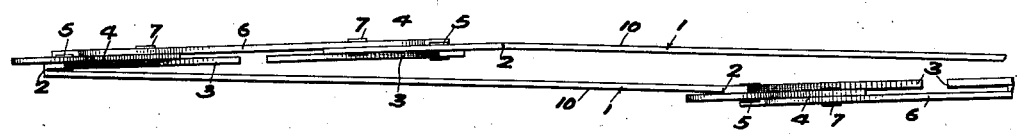
Fig. 5 is a fragmentary plan showing the rack in a folded or knock-down condition.

As shown in Fig. 5, the rack may be folded to a flat position, the scoring 2 acting as hinging means.

Figure 6:
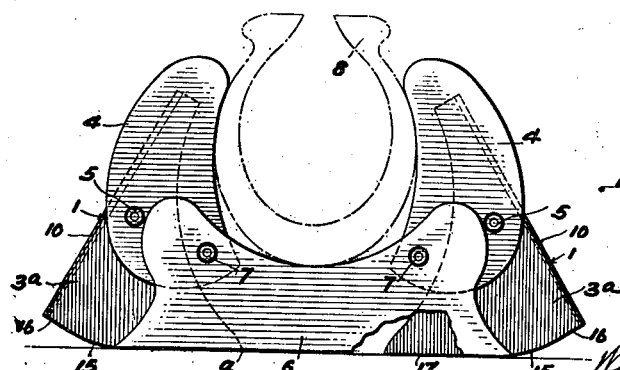
Fig. 6 is an end elevation similar to Fig. 2 of a modified form.

In the modification shown in Fig. 6, the bottom edges of the ends 3ª are formed to provide an arc portion 15, the arc having its center at the pivot 7, and its radius being equal to the distance from the said pivot to the supporting surface *a*, when the side 1 is in a vertical position, as shown in Fig. 2.

Flat stop portions 16, 17, tangent at each side of the arc portion 15 act respectively to limit the sides 1, in a vertical position, and in a position at approximately 30° with the vertical, the angular position of the said sides facilitating the reading of the advertising matter thereon.

In the operation of our rack, the same being set as shown in Fig. 3, the tire is placed upon the cross members 6, its weight acting to depress the said members, and through such action to swing the jaws 4 against the sides of the tire, as shown in Fig. 2, to clamp and support the same in display position. The lowermost point of the circumference of the tire casing, between the cross members and within the walls of the rack, may or may not rest upon the supporting surface *a*, depending upon the circumference of the tire casing, but, in either event, the tire casing will be held securely clamped in a vertical position by the jaws 4.

Having described our invention, we claim:

1. In a device of the class described, two side sections, each scored and bent to form half end sections, the said side and end sections being juxtaposed to form a rectangular box-like structure, open at its top and bottom, a jaw pivoted to each half end section to form pairs of clamping means, a bridge member pivoted to each pair of jaws, the said bridge member acting to connect the said side and end sections and to operate said jaws.

2. In a device of the class described, two half rectangular sections juxtaposed to form a box-like structure, open at the top and bottom, jaws pivoted at each end of each half rectangular section, forming pairs of opposed clamping elements, a bridge member pivoted to and connecting each pair of opposed jaws, and acting to operate said jaws to clamp a body therebetween.

3. In a device of the class described, two half rectangular sections juxtaposed to form a box-like structure open at the top and bottom, the upper edges of the end sections of the opposed half rectangular sections being formed to provide a semi-circular pocket, jaws pivoted to each end section, in opposing pairs, a bridge member pivoted to and connecting each pair of jaws, to form an operating link therebetween, for clamping said jaws about the lower segment of a tire.

4. In a device of the class described, a pair of opposite side walls, each having end flaps at its opposite ends foldable inwardly, jaw members respectively pivoted to said end flaps opposingly arranged for clampingly engaging an article therebetween, and cross-members each respectively pivoted at its opposite ends to corresponding opposite jaws, providing connecting end walls for said side walls.

In witness whereof, we hereunto subscribe our names, as attested by the two subscribing witnesses.

WM. M. DOERING.
CHARLES J. DOERING.

Witnesses:
L. A. BECK,
J. C. JUNIUS.